(No Model.)

G. R. PHILLIPS.
PACKING FOR VESSELS, &c.

No. 323,731. Patented Aug. 4, 1885.

WITNESSES:
Chas. H. Luther Jr
Jno. L. Condron

INVENTOR:
George R. Phillips
by Joseph A. Miller & Co
Attys

UNITED STATES PATENT OFFICE.

GEORGE R. PHILLIPS, OF PROVIDENCE, RHODE ISLAND.

PACKING FOR VESSELS, &c.

SPECIFICATION forming part of Letters Patent No. 323,731, dated August 4, 1885.

Application filed April 23, 1885. (No model.)

*To all whom it may concern:*

Be it known that I, GEORGE R. PHILLIPS, of the city and county of Providence, and State of Rhode Island, have invented a new and useful Packing for Vessels and other Devices, of which the following is a full, clear, and exact description, reference being had to the accompanying drawings, forming a part of this specification.

My invention relates to packings for the contiguous surfaces of pulp-digesters and other receptacles for substances under pressure; and my invention is applicable also to steam-cylinders and to a large class of devices.

The object of my invention is to produce a packing in which the true packing material shall be held securely in proper position, and at the same time be protected from exposure to deteriorating substances, while also readily inserted into and removed from position.

To the above purposes my invention consists in a packing composed of an elastic material, constituting the packing proper, and a rigid frame of harder material to hold the elastic material in proper position and protect it from deterioration.

In order that my invention may be fully understood, I will proceed to describe it with reference to the accompanying drawings, in which—

Figure 3:
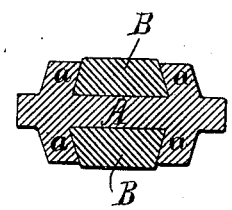
Figure 2:
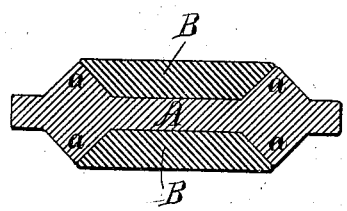
Figure 1:
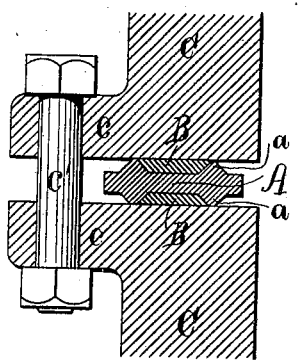

Figure 1 is a transverse sectional view of my improved packing as applied to the joint of a receptacle, a portion of the latter being also shown in section. Fig. 2 is a similar view of the packing detached from the joint. Fig. 3 is a similar view of a modified form of my invention.

In the said drawings, Fig. 2, A designates a frame-work or casting, of metal, which is formed with the lateral extensions $a$ of wedge-shape, the apex of each extension being most remote from the frame A. B B designate two blocks or strips of elastic material, which are set upon the two sides of the frame, and each of which is confined between two of the extensions.

In Fig. 1, C C designate the contiguous portions of two sections of the wall of a receptacle—such as a pulp-digester or any other receptacle for substances under pressure. These two sections are joined together by a bolt, $c'$, which passes through the flanges $c$ of the sections. The packing is interposed between the contiguous edges of the sections, and the thickness of the elastic material is such that when properly compressed its outer surface shall lie flush with the outer ends of the extensions. In this case the elastic material may be of rubber and the frame and its extensions of lead, which is not affected by the action of any acids in the pulp. Thus the elastic material is completely inclosed by the extensions and the edges of the sections, so that no deteriorating substance can act upon it.

In the above form my packing is applicable to joints between immovable surfaces; but in Fig. 3 I have illustrated a modified form of my packing, in which it is applicable to the joints between moving surfaces, as between the cylinder and a piston of a steam-engine, and in similar situations. In this instance the extensions $a$ on each side of frame A are curved toward each other, so as to hold the elastic material B between them and prevent it from falling out of place.

The elastic material may be either rubber or any other elastic substance, and the frame, with its extensions, should be of a metal softer than the surfaces forming the joint.

Thus it will be seen that the packing is readily inserted and removed as a whole, and that the elastic material is well protected against deterioration.

I am aware that heretofore elastic packings have been produced in which the elastic material is held in a metal frame, so as to protect the elastic material from contact with injurious substances; but my invention possesses an important advantage over such previous devices in that, while the protecting frame has heretofore had to be bent in order to hold the elastic material my improved frame is so formed as to be complete and capable of holding the elastic material without any preliminary bending, thus simplifying the construction of the packing and increasing its cheapness.

Having thus described my invention, I claim as new and desire to secure by Letters Patent—

1. An improved packing composed of elastic material attached to a rigid metal frame having extensions to inclose the elastic material laterally, as set forth.
2. The rigid frame A, formed with the extensions a, as described.
3. The combination, with the rigid frame A, formed with the extensions a, of the elastic blocks or strips B, as specified.

GEORGE R. PHILLIPS.

Witnesses:
M. F. BLIGH,
J. A. MILLER, Jr.